(12) United States Patent  
Boyer et al.

(10) Patent No.: US 6,722,525 B1  
(45) Date of Patent: Apr. 20, 2004

(54) PHARMACEUTICAL STORAGE AND RETRIEVAL DEVICE

(75) Inventors: Joseph H. Boyer, Johnson City, NY (US); William S. Bennett, Binghamton, NY (US)

(73) Assignee: Innovation Associates, Inc., Johnson City, NY (US)

( * ) Notice: Subject to any disclaimer, the term of this patent is extended or adjusted under 35 U.S.C. 154(b) by 22 days.

(21) Appl. No.: 10/233,744

(22) Filed: Sep. 3, 2002

(51) Int. Cl.$^7$ .............................................. B65G 59/00
(52) U.S. Cl. ....................................... 221/130; 221/277
(58) Field of Search ............................. 221/2, 7, 9, 13, 221/92, 132, 129, 130, 119, 231, 224, 277

(56) References Cited

U.S. PATENT DOCUMENTS 5,814,277 A    9/1998   Bell et al.

Primary Examiner—Kenneth W. Noland
(74) Attorney, Agent, or Firm—Mark Levy & Associates

(57) ABSTRACT

A medicating device for a hospital or nursing home that provides the correct medication for each individual occupant of a portion of the institution, at the right time of the day. The medicating device includes a control computer that sends instructions to a dispensing device. The dispensing device is then caused to discharge a particular tablet stored therein. The device contains a series of parallel, annular, arcuately shaped plates that are stacked closely together. Resting on each plate are multiple curved tablet trays that are arcuately disposed thereupon. Each tray contains a number of tablets or capsules disposed within individual cells of the arcuate plate. The plates are rotated under the control of the computer by a motor drive. A retrieval mechanism then rises or descends to address one of the plates.

20 Claims, 3 Drawing Sheets

PHARMACEUTICAL STORAGE AND RETRIEVAL DEVICE

FIELD OF THE INVENTION

The invention pertains to pharmaceutical storage and retrieval systems and, more particularly, to a pharmaceutical storage and retrieval device for institutions providing individuals with the correct dosage at the correct time of day.

BACKGROUND OF THE INVENTION

In large institutions like hospitals and nursing homes, the dispensing of medication to many individuals at different times of the day can pose a challenging and perplexing problem for the nursing staff. Even automated procedures can be fraught with human error. The present invention relates to a device for storing and retrieving single doses of pharmaceuticals for patients confined within large and medium-sized institutions. The storage and retrieval device has a small footprint so that it can be easily accommodated within the ward or the nurse's desk area on each floor.

The present invention fulfills the need to provide single doses of particular tablets or capsules under the control of a computer, to individuals one at a time. Of primary importance is the need to dispense the correct drug in the correct strength, and deliver it at the correct time of day as ordered by each physician for his patient.

The retrieval system of the invention comprises a control computer that sends instructions to a dispensing device. The dispensing device is then caused to discharge a particular tablet stored therein. The device contains a series of parallel, annular, and arcuate plates stacked closely together. Resting on each plate are multiple curved tablet trays circularly disposed thereupon. Each tray contains a number of tablets or capsules disposed within individual cells of the arcuate plate.

The plates are rotated under the control of the computer by a motor drive. A retrieval mechanism then rises or descends to address one of the plates. The retrieval mechanism comprises a tooth-shaped tray extractor wheel (held and moved by a support member), toothed guide wheels, and a tablet inserter and retriever unit, all of which are connected to and supported by an elevating mechanism.

Under instructions from the computer, the support member causes the tooth-shaped tray extractor wheel to engage the tooth-shaped rack on one of the curved trays. A wheel then extracts the tray from the plate and inserts it into the tablet extractor thus positioning the correct cell in the active part of tablet extractor unit. The tablet extractor unit then extracts a tablet and drops it down a chute to a collection area. The tablet extractor unit is also capable of receiving a tablet and placing it into one of the cells of a tray. Toothed guide wheels assist in guiding the tray so it passes into the tablet extractor unit. The extractor wheel then reinserts a tray into the plate, making the device ready for retrieval of the next needed tablet.

DISCUSSION OF RELATED ART

In U.S. Pat. No. 5,814,277, issued to Bell et al on Sept. 29, 1998 for Automatic Multiple-Sample Multiple-Reagent Chemical Analyzer, a chemical analyzer is illustrated. This chemical analyzing unit is built with curved trays on a circular turntable, not unlike the invention. The device handles reagents and test samples and does not store or dispense medications. It is also to be observed that the analyzer does not move its trays along an arcuate path. Rather, there is a single probe moving in a radial arc in order to access liquids disposed on the turntable. A single curved tray is made accessible to the arcuate path and holds other liquids to be accessed by the probe.

SUMMARY OF THE INVENTION

In accordance with the present invention, a medicating system provides single doses of particular tablets or capsules under the control of a computer to individuals, one at a time. Of primary importance is the need to dispense the correct drug in the correct strength, and deliver it at the correct time of day as ordered by each physician for each of his patients. The medicating system comprises a control computer that sends instructions to a dispensing device. The dispensing device is then caused to discharge a particular tablet stored therein.

The device contains a series of parallel, annular, and arcuately shaped plates stacked closely together. Resting on each plate are multiple curved tablet trays arcuately disposed thereupon. Each tray contains a number of tablets or capsules disposed within individual cells of the arcuate plates. Each of the plates is rotated under the control of the computer by a motor drive. A retrieval mechanism then rises or descends to address one of the plates.

The retrieval mechanism comprises a tooth-shaped tray extractor wheel (held and moved by a support member), toothed guide wheels, and tablet inserter and retrieval unit, all connected to and supported by an elevating mechanism. Under instructions from the computer, the support member causes the tooth-shaped tray extractor wheel to engage the tooth-shaped rack on one of the curved trays. A wheel then extracts the tray from the plate and inserts it into the tablet extractor, thus positioning the correct cell in the active part of tablet extractor unit. The tablet extractor unit then extracts a tablet and drops it down a chute to a collection area.

The tablet extractor unit is also capable of receiving a tablet and placing it into one of the cells of a tray. Toothed guide wheels assist in guiding the tray so it passes into the tablet extractor unit. The extractor wheel then reinserts the tray into the plate, making the device ready for retrieval of the next needed tablet.

It is an object of the present invention to provide an improved medicating device that dispenses the right medication to each individual in an institution at the right time of day.

It is another object of this invention to provide a medicating system for an institution that has a small footprint.

BRIEF DESCRIPTION OF THE DRAWINGS

A complete understanding of the present invention may be obtained by reference to the accompanying drawings when considered in conjunction with the subsequent detailed description, in which.

For purposes of brevity and clarity, like components and elements of the apparatus of this invention will bear the same designations or numbering throughout the figures.

DESCRIPTION OF THE PREFERRED EMBODIMENT

Generally speaking, the invention features a medicating device for a hospital or nursing home, providing the correct medication for each individual occupant of a portion of the institution at the right time of day. The medicating device comprises a control computer that sends instructions to a dispensing device. The dispensing device is then caused to discharge a particular tablet stored therein. The device contains a series of parallel, annular, and arcuately shaped plates stacked closely together. Resting on each plate are multiple curved tablet trays arcuately disposed thereupon. Each tray contains a number of tablets or capsules disposed within individual cells of the arcuate plate. The plates are rotated under the control of the computer by a motor drive. A retrieval mechanism then rises or descends to address one of the plates. The retrieval mechanism comprises a tooth-shaped tray extractor wheel (held and moved by a support member), toothed guide wheels, and tablet inserter and retrieval unit, all connected to and supported by an elevating mechanism.

Figure 1:
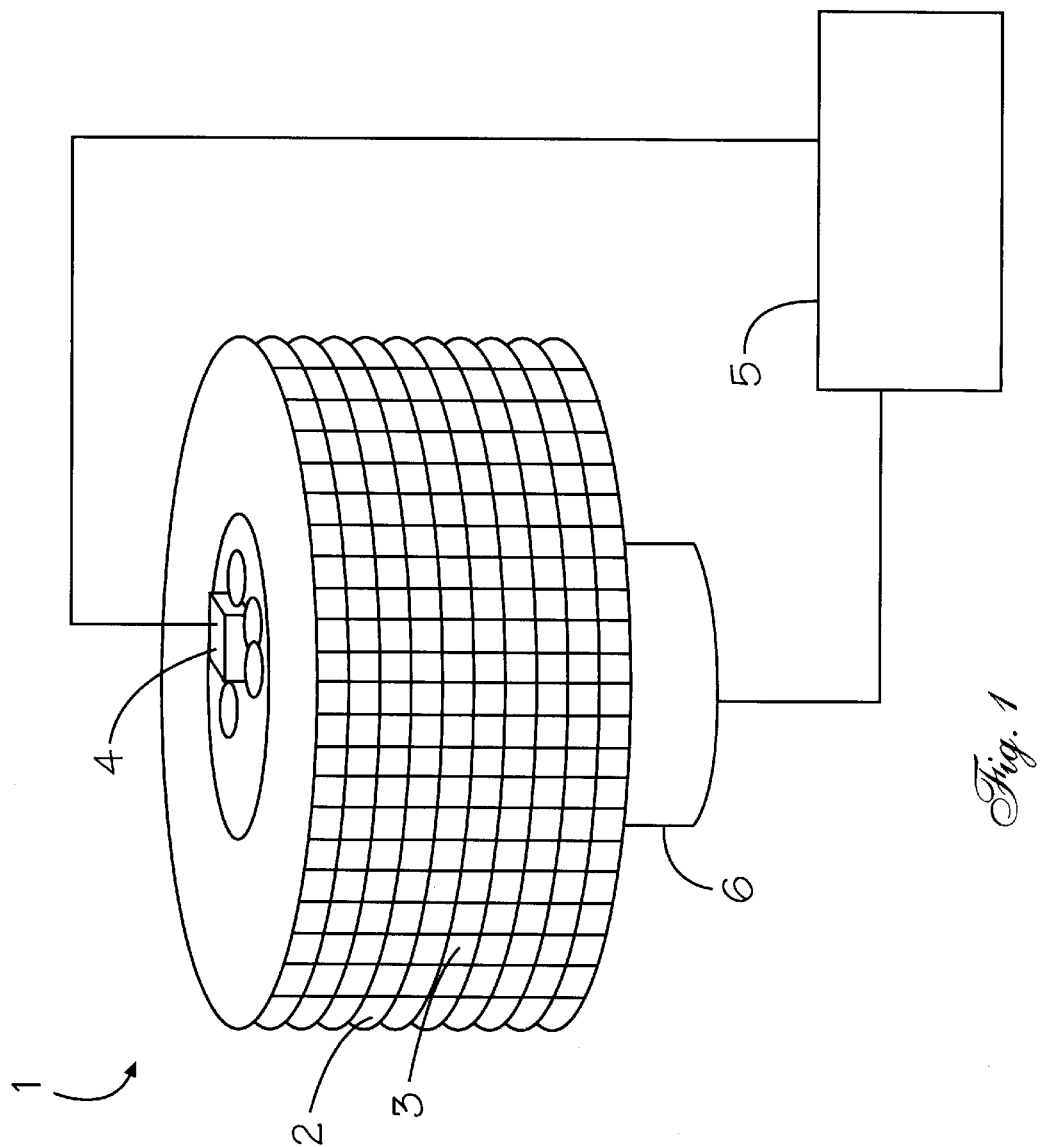
FIG. 1 illustrates a schematic perspective view of the storage and retrieval system of this invention.

Now referring to FIG. 1, the dispensing system 1 of this invention is illustrated. A control computer 5 sends instructions to the dispensing system 1, causing a particular tablet stored in the system 1 to be emitted. System 1 contains a series of parallel, annular, and circular plates 2 stacked closely together. It is observed that plates 2 will be rotatively driven under the control of computer 5 by drive 6. A retrieval mechanism 4 then rises or descends to address one of the plates 2.

Figure 2:
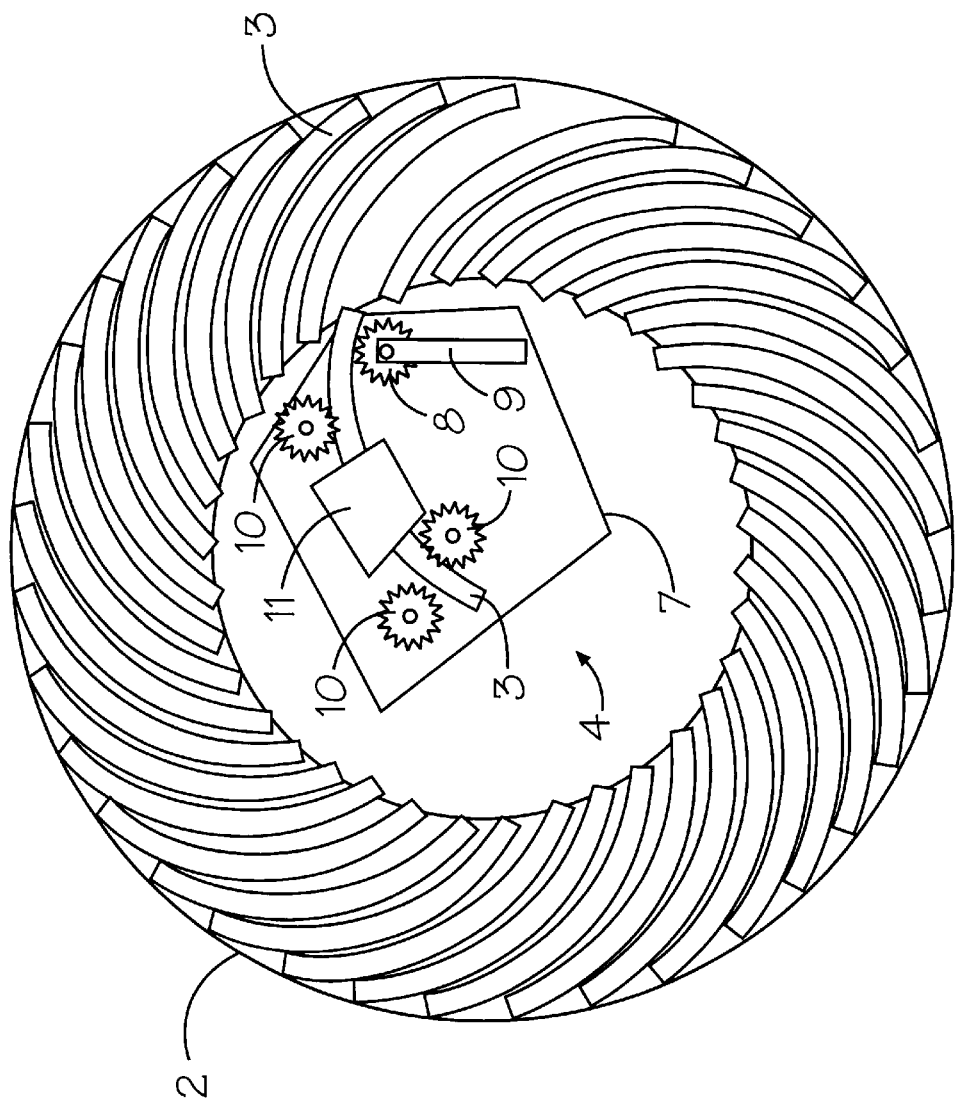
FIG. 2 depicts a sectional, schematic top view of a typical plate of the storage and retrieval tray illustrated in FIG. 1.

Resting on each plate 2 are multiple curved tablet trays 3 that are circularly disposed about the device, as shown in FIG. 2. Retrieval mechanism 4 comprises a tooth-shaped extractor wheel 8 (held and moved by support member 9), toothed guide wheels 10, and tablet inserter and retriever unit 11, all of which are connected to and supported by elevating mechanism 7.

Figure 3:
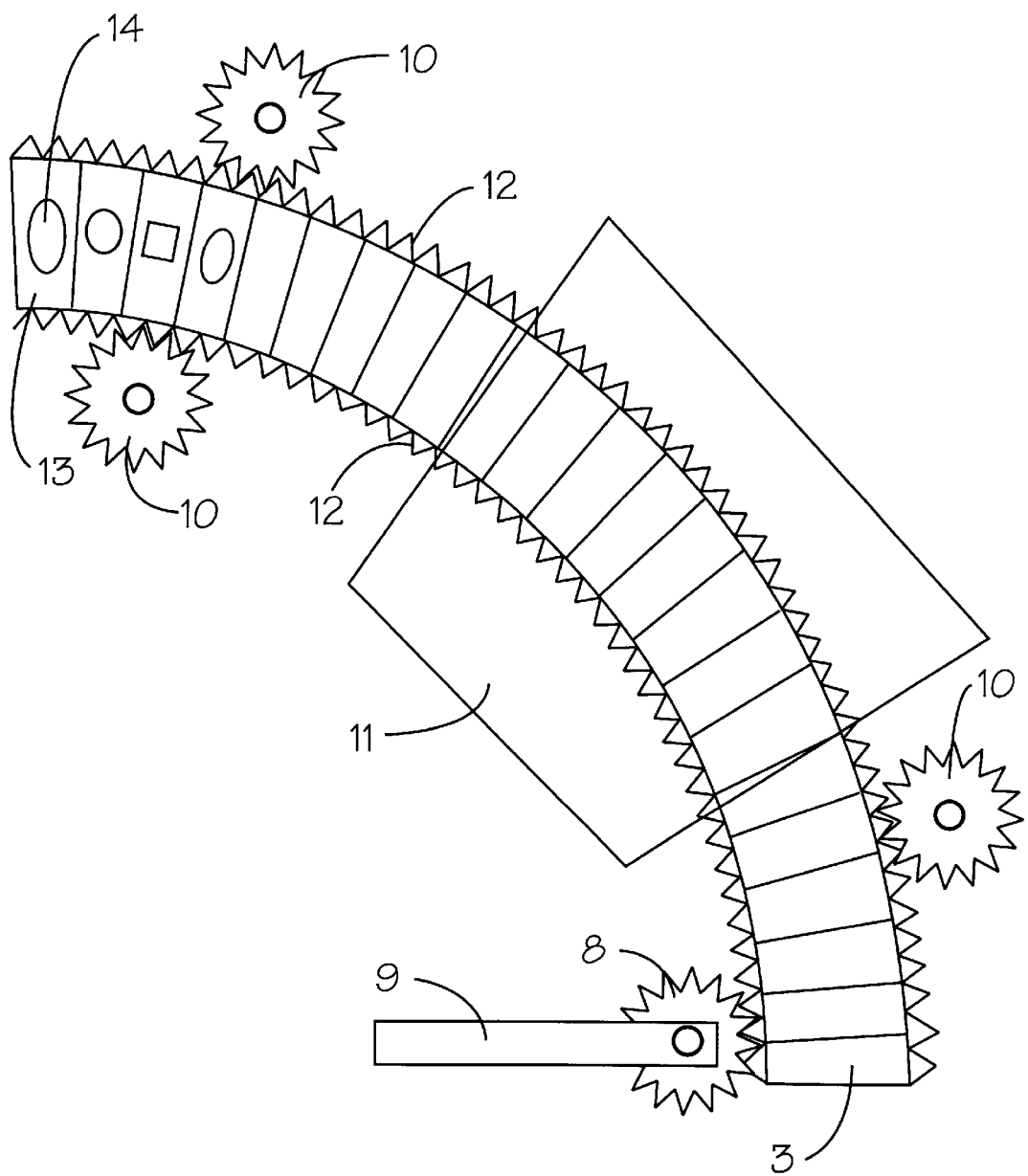
FIG. 3 shows an enlarged, partial, schematic top view of the plate depicted in FIG. 2.

Referring to FIG. 3, each tray 3 is shown containing a number of tablets or capsules 14 disposed within individual cells 13. Under instructions from computer 5, support member 9 causes the tooth-shaped extractor wheel 8 to engage with the tooth-shaped circular rack 12 disposed on one of curved trays 3. Wheel 8 then extracts tray 3 from plate 2 along an arcuate path engaging with the tablet extractor 11 and positions the correct cell 13 (FIG. 3) within the active part of tablet extractor 11. Tablet extractor 11 is then caused to extract tablet 14, dropping it down a chute into a collection area (not shown).

The tablet extractor 11 is also capable of receiving a tablet 14 and placing it, into one of the cells 13 of a tray 3. Toothed guide wheels 10 help to guide tray 3 so it passes into tablet extractor 11. Extractor wheel 8 will then reinsert tray 3 into plate 2, readying the retrieval mechanism 4 for the next tablet to be dispensed.

Since other modifications and changes varied to fit particular operating requirements and environments will be apparent to those skilled in the art, the invention is not, considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A storage and retrieval system for an institution that correctly dispenses medications for each individual occupant in at least a portion of the institution, at the right time of day, said storage and retrieval system comprising:

a number of stacked plates comprising a plurality of trays containing a plurality of cells comprising medications stored therein, said trays dispensing medications for each individual occupant;

drive means operatively connected to said number of stacked plates in order to provide access thereto;

computing means operatively connected to said drive means, for controlling said drive means; and a retrieval mechanism operatively connected to said drive means, said retrieval mechanism translating with respect to said stacked plates, for addressing one of plates in order to access and retrieve medication.

2. The storage and retrieval system in accordance with claim 1, wherein each of said trays are arcuately disposed within one of said stacked plates, and are extractable along an arcuate pathway therefrom, in response to operation of said retrieval mechanism.

3. The storage and retrieval system in accordance with claim 1, wherein said retrieval mechanism comprises elevating means driven by said drive means for translating through said stacked plates by vertically ascending and descending through said stacked plates, and coming to rest opposite a particular one of said stacked plates containing a tray to be accessed.

4. The storage and retrieval system in accordance with claim 1, wherein said drive means rotates said stacked plates into an accessible position with respect to said retrieval mechanism.

5. The storage and retrieval system in accordance with claim 3, wherein said retrieval mechanism comprises a tooth-shaped, tray extractor wheel, and guide wheels, supported by said elevating means.

6. The storage and retrieval system in accordance with claim 1, wherein said retrieval mechanism comprises a tablet extractor, and wherein each tray in a given plate of said stacked plates s arcuately movable into engagement with said tablet extractor.

7. A storage and retrieval system that correctly dispenses medication for an individual at the right time of the day, said storage and retrieval system, comprising:

a number of stacked plates comprising a plurality of trays containing a plurality of medications stored therein, said trays dispensing medications for each individual;

a retrieval mechanism that translates with respect to said stacked plates, for addressing one of plates in order to access and retrieve medication; and drive means operatively connected to said number of stacked plates in order to rotate said stacked plates into an accessible position with respect to said retrieval mechanism, said rotation providing access to one of said trays supported by a plate, and containing a select medication, said drive means further providing translational movement to said retrieval mechanism within said stacked plates in order to posit ion said retrieval mechanism opposite a select plate of said stacked plates.

8. The storage an d retrieval system in accordance with claim 7, further comprising computing means operatively connected to said drive means, f or controlling said drive means.

9. The storage and retrieval system in accordance with claim 7, wherein each of said trays are arcuately disposed within one of said stacked plates, and are extractable along an arcuate pathway therefrom, in response to operation of said retrieval mechanism.

10. The storage and retrieval system in accordance with claim 7, wherein said retrieval mechanism comprises elevating means driven by said drive means for translating through said stacked plates by vertically ascending and descending through said stacked plates, and coming to rest opposite a particular one of said stacked plates containing a tray to be accessed.

11. The storage and retrieval system in accordance with claim 10, wherein said retrieval mechanism comprises a tooth-shaped, tray extractor wheel, and guide wheels, supported by said elevating means.

12. The storage and retrieval system in accordance with claim 7, wherein said retrieval mechanism comprises a tablet extractor, and wherein each tray in a given plate of said stacked plates is arcuately movable into engagement with said tablet extractor.

13. The storage and retrieval system in accordance with claim 7, wherein each tray in each stack of said stacked plates is arcuately movable to a center portion thereof.

14. A storage and retrieval system that correctly dispenses medication for an individual at the right time of the day, said storage and retrieval system, comprising:

a number of stacked plates comprising a plurality of trays containing a plurality of medications that are stored therein, said trays dispensing medications for each individual;

a retrieval mechanism that translates through a center portion of said stacked plates, for addressing one of said plates in order to access and retrieve medication; and drive means operatively connected to said number of stacked plates in order to rotate said stacked plates into an accessible position with respect to said retrieval mechanism, said rotation providing access to one of said trays supported by a select plate, and containing a select medication, said drive means further providing translational movement to said retrieval mechanism within said center portion of said stacked plates in order to position said retrieval mechanism opposite a select plate of said number of stacked plates.

15. The storage and retrieval system in accordance with claim 14, further comprising computing means operatively connected to said drive means, for controlling said drive means.

16. The storage and retrieval system in accordance with claim 14, wherein each of said trays are arcuately disposed within one of said stacked plates, and are extractable along an arcuate pathway therefrom, in response to operation of said retrieval mechanism.

17. The storage and retrieval system in accordance with claim 14, wherein said retrieval mechanism comprises elevating means driven by said drive means for translating through said stacked plates by vertically ascending and descending through said stacked plates, and coming to rest opposite a particular one of said stacked plates containing a tray to be accessed.

18. The storage and retrieval system in accordance with claim 17, wherein said retrieval mechanism comprises a tooth-shaped, tray extractor wheel, and guide wheels, supported by said elevating means.

19. The storage and retrieval system in accordance with claim 14, wherein said retrieval mechanism comprises a tablet extractor, and wherein each tray in a given plate of said stacked plates is arcuately movable into engagement with said tablet extractor.

20. The storage and retrieval system in accordance with claim 14, wherein each tray in each stack of said stacked plates is arcuately movable to a center portion thereof.

* * * * *